June 7, 1938.  R. H. LIMPP  2,120,182
PNEUMATIC FLEXIBLE COUPLING
Filed July 21, 1936

Rufus H. Limpp.
INVENTOR
BY Victor J. Evans & Co.
ATTORNEYS

Patented June 7, 1938

2,120,182

UNITED STATES PATENT OFFICE 2,120,182

PNEUMATIC FLEXIBLE COUPLING

Rufus H. Limpp, King City, Mo.

Application July 21, 1936, Serial No. 91,764

1 Claim. (Cl. 64—11)

This invention relates to shaft couplings and has for the primary object the provision of an efficient and inexpensive device of this character which will readily flex to compensate for misalignment between shafts connected by said device and also will absorb shocks to prevent shock from being transmitted from one shaft to the other shaft.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a side elevation illustrating shafts of devices connected by a coupling constructed in accordance with my invention.

Figure 1:
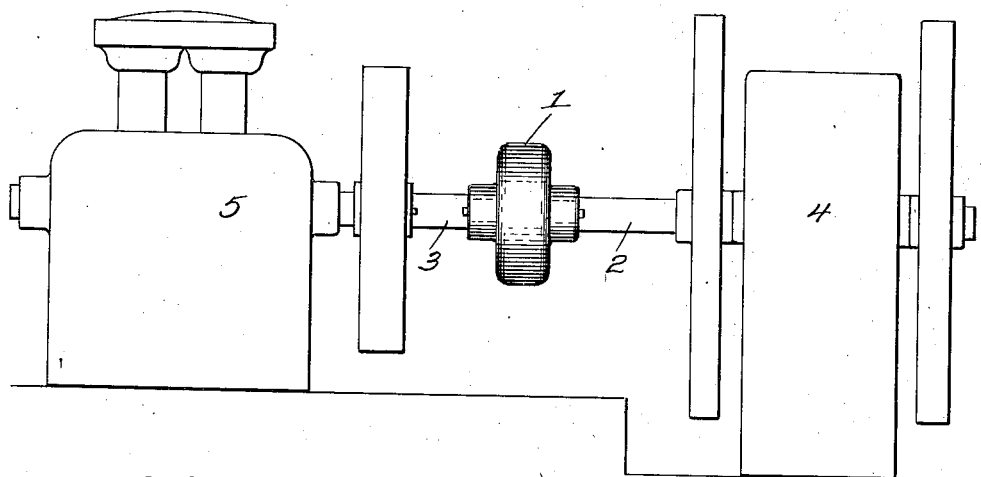
Figure 2:
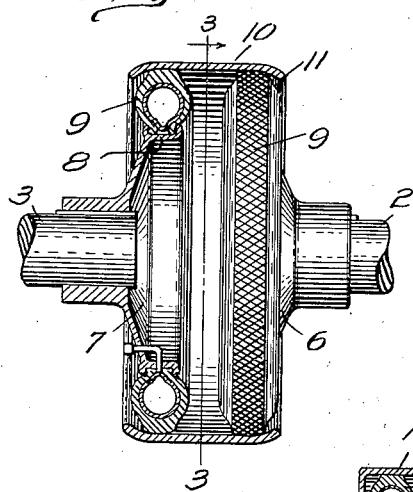
Figure 2 is a vertical sectional view illustrating the coupling.
Figure 3:
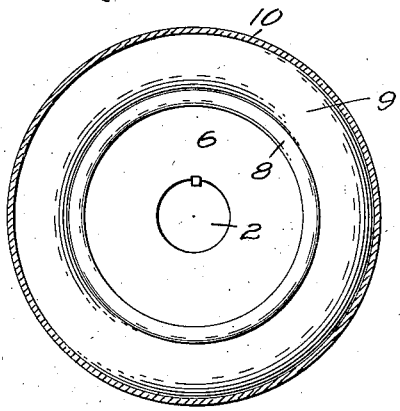
Figure 3 is a sectional view taken on the line 3—3 of Figure 2.
Figure 4:
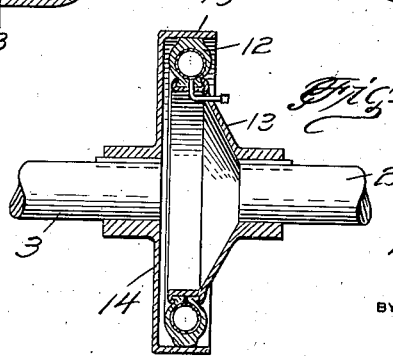
Figure 4 is a vertical sectional view illustrating a modified form of my invention.

Referring in detail to the drawing, the numeral 1 indicates a coupling for connecting shafts 2 and 3 of devices 4 and 5. The device 4 may be in the form of an engine and the device 5 may be in the form of a compressor driven by the engine through the coupling of the shafts 2 and 3 together. In many instances, the devices 4 and 5 or the shafts 2 and 3 thereof may not exactly align and in order to compensate for the misalignment the coupling 1 is capable of flexation, also will absorb shocks such as power impulses from the device 4 and prevent them from being transmitted to the device 5.

The coupling 1 consists of wheels 6 and 7 keyed or otherwise secured to the shafts 2 and 3. Each wheel includes a flanged felly 8 for retaining thereon a pneumatic tire 9 which includes the usual outer shoe and the inflatable inner tube. Contacting the treads of the shoes of the tires 9 is an annular metallic band 10 having the opposite edges thereof curved, as shown at 11. The band 10 is applied to the tires 9 when the latter are deflated so that when such tires are inflated a tight contact will be had between the tires and the band so that the tire of the wheel 6 will impart driving force from the shaft 2 to the band and the latter in turn imparts said driving force to the tire of the wheel 7 secured to the shaft 3. The tire will permit a flexing of the coupling besides will act to absorb shocks.

Referring to my modified form of invention a single tire 12 is employed and a wheel 13 has the tire mounted thereon and secured to the shaft 2 while the shaft 3 has secured thereto a wheel 14 which includes an annular band 15. The band 15 has frictional contact with the tread of the tire 12.

Having described the invention, I claim:

A coupling comprising a pair of opposed wheel members, each provided with hub portions, a rim on each hub, an inflatable annulus on each rim, and a cylindrical band snugly engaging the peripheries of said inflatable annuli and provided with integral reduced opposite end portions, said reduced end portions having the smallest interior diameter thereof of a size sufficient to hold said band against longitudinal movement relative to the axes of said wheels while permitting easy removal of said inflatable annuli upon deflation thereof, said band being removable axially of said wheel members upon deflation of said annuli to thereby uncouple said wheel members.

RUFUS H. LIMPP.